(12) United States Patent
Tsui et al.

(10) Patent No.: US 6,448,921 B1
(45) Date of Patent: Sep. 10, 2002

(54) CHANNELIZED MONOBIT ELECTRONIC WARFARE RADIO RECEIVER

(75) Inventors: James B. Y. Tsui, Dayton; James N. Hedge, Medway; Vasu D. Chakravarthy, Beavercreek; Keith M. Graves, Springfield, all of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/917,589

(22) Filed: Jul. 30, 2001

(51) Int. Cl.[7] .................................................. G01S 7/40
(52) U.S. Cl. .......................... 342/13; 342/20; 342/175; 342/195; 342/196
(58) Field of Search ............................ 342/13–20, 175, 342/192, 193–197, 89–103

(56) References Cited

U.S. PATENT DOCUMENTS

| | | | |
|---|---|---|---|
| 5,793,323 A | 8/1998 | Tsui | |
| 5,917,737 A | 6/1999 | Tsui et al. | |
| 5,963,164 A | 10/1999 | Tsui et al. | |
| 6,191,727 B1 * | 2/2001 | Springer et al. | 342/195 |
| 6,271,787 B1 * | 8/2001 | Springer et al. | 342/195 |
| 6,292,128 B1 * | 9/2001 | Tsui et al. | 342/13 |
| 6,313,781 B1 * | 11/2001 | Lee | 342/13 |

* cited by examiner

*Primary Examiner*—Bernarr E. Gregory
(74) *Attorney, Agent, or Firm*—Gerald B. Hollins; Thomas L. Kundert

(57) ABSTRACT

An electronic warfare radio receiver of the monobit type wherein the signal processing circuitry, including a bandpass filter array, analog to digital converter circuit and Fourier transformation circuit, are located in a plurality of parallel-disposed but isolated receiver channels. The parallel disposed receiver channels limit interference between received signals and enable the customary processing of two simultaneous input signals of differing signal strength in each receiver channel; this increases the number of simultaneous input signals processable by a factor equaling the number of receiver channels used. Single chip embodiment of the receiver is disclosed thereby tending to compensate for the added complexity of the channelized processing. Signals falling in digital filter overlap regions are addressed by the invention.

21 Claims, 6 Drawing Sheets

CHANNELIZED MONOBIT ELECTRONIC WARFARE RADIO RECEIVER

RIGHTS OF THE GOVERNMENT

The invention described herein may be manufactured and used by or for the Government of the United States for all governmental purposes without the payment of any royalty.

BACKGROUND OF THE INVENTION

As discussed in our earlier U.S. Pat. No. 5,793,323 issued to one inventor named in the present patent document the role of an electronic warfare radio receiver is to provide an operator with information indicating a search signal, a signal originating from for example a hostile radar apparatus, has discovered or at least been received at the operator's location. This search signal may be as brief in its time duration as a single pulse of radio frequency A carrier signal—as indeed is in accordance with the practice used in modern stealth-considered radar equipment. Such a pulse of radio frequency carrier signal may in addition be of 100 nanoseconds or less duration in a present day radar system. From this short pulse width received signal it is nevertheless desirable to determine as much information as possible about the signal's originating radar apparatus, especially such information as the carrier frequency and the spectral characteristics of the radar.

Although there exists a number of different types of wide band radio receivers capable of performing the functions of an electronic warfare receiver under idealized conditions, several of these receivers are large in physical size and expensive to build and maintain. In addition, when two signals arrive simultaneously at certain versions of these receivers i.e., two signals which are concurrent within a time interval such as one tenth of a microsecond, a signal processing difficulty is encountered. The processing of two signals separated by a time interval greater than this one tenth of microsecond is of course a much easier accomplishment and can be performed by a number of different broadband receiver types.

A receiver based on real time application of the discrete Fourier Transform mathematical function has been found to provide desirable performance characteristics in the electronic warfare environment. Fourier transform concepts have of course been known and used in other equipment for some time however difficulties in mechanizing certain parts of such apparatus in the real time and in the gigahertz operating frequency environment of current-day electronic warfare interest (and possibly within the size and weight limitations imposed by airborne or portable equipment requirements) have precluded use of such receivers for most non-laboratory purposes including military receivers.

Conventional wisdom in the electrical arts once suggested the implementation of a Fourier transform function for such a receiver using electronic components required the brute force adherence to the Fourier transformation mathematical definition and mechanization of mathematical multiplications, i.e., the consideration of real and imaginary components in the mathematical quantities or the signals appearing in the Fourier transform equation. In addition, the consideration of amplitude representations requiring several binary bits of data was once required by this conventional wisdom approach to the Fourier transform. These requirements were considered necessary in order to avoid the generation of spurious frequency components in the achieved Fourier transform function.

In recent years however we have demonstrated that an electronic warfare radio receiver of the monobit receiver type may use a unit value kernel function realization concept in implementing the discrete Fourier transform (DFT) thus eliminating the need for multiplication in this part of the receiver's signal processing circuitry. Arrangements of this nature are disclosed in our prior U.S. Pat. Nos. 5,917,737 and 5,963,164, each issued in the name of one inventor of the present invention and one or more colleagues, patents originating in a U.S. Air Force laboratory. A most recent improvement in this single bit Kernel function arrangement is disclosed in the U.S. patent application of Ser. No. 09/944,616 a currently pending U.S. patent application of one present inventor and a colleague. Each of the herein identified patents/applications is hereby incorporated by reference herein.

The unit value kernel function concept has also been implemented in an application specific integrated circuit (ASIC) chip in this U.S. Air Force laboratory. The unit value Kernel function discrete Fourier transform concept and the arrangement of this integrated circuit chip have therefore been successfully demonstrated with real world electronic components. A single chip monobit electronic warfare radio receiver using this unit value Kernel function covers a 1.25 GHz instantaneous bandwidth and accomplishes a 256-point discrete Fourier transform in real time every 102.4 ns. This ASIC chip is being implemented in the form of a high speed field-programmable gate array in order to conveniently allow for improvements and includes arbitration logic determining the number of input signals and their frequencies. The encoding logic of this chip identifies the highest two amplitudes from a total of 128 (i.e., 256/2) frequency identification output signals.

An area for improvement in a monobit electronic warfare receiver according to the earlier of these patents concerns the achieved two-tone instantaneous dynamic range of the receiver possibly being undesirably low. The instantaneous dynamic range of a receiver relates to its ability to detect two simultaneous signals of different amplitude. If more than two signals of equal amplitude are received in a conventional electronic warfare receiver the receiver may respond by providing erroneous frequency information. In fact prior to our work with the monobit receiver no receiver could determine the presence of more than one signal and if the signals were false in nature. The monobit receiver is a resounding success in situations wherein the signal separation need is limited to 5 dB however if greater separations are needed then a more complex receiver is appropriate or an improvement to the monobit receiver as provided by the present invention is in order.

In fact with the approximation of the unit value Kernel function realization in a monobit receiver, when the four unit value algorithms of the U.S. Pat. Nos. 5,917,737 and 5,963,164 patents are used in a monobit receiver, the receiver is found to be capable of processing at least two input signals. The eight value Kernel function arrangement of the concurrently pending Ser. No. 09/944,616 patent application moreover provides improvement over the arrangements of these two patents with respect to dynamic range and other characteristics. The present invention provides yet additional improvement in this type of electronic warfare radio receiver.

The use of channelized radio receivers i.e., a radio receiver wherein an incoming radio frequency signal is divided into plural frequency-segregated segments is known in the electronic art. Such receivers perform the channelizing function for a variety of reasons including the accomplishment of differing signal processing steps in the different channels, the desired physical separation of hardware relating to different channels and the preclusion of cross channel interference effects. Some of these previous channelized receiver arrangements moreover involve signal processing employing the Fourier transformation mathematical operation. None of these prior receiver arrangements however result in an increase in the instantaneous dynamic range of the receiver, an increase in the number of simultaneous signals correctly identified nor employ a simplified Kernel function in their processing circuits all as disclosed in the present invention.

SUMMARY OF THE INVENTION

The present invention provides a monobit electronic warfare radio receiver in which a plurality of individual monobit radio receiver circuits are disposed in parallel in order to improve receiver performance.

It is therefore an object of the present invention to improve the instantaneous dynamic range of a real time-operating monobit electronic warfare radio receiver i.e., improve the instantaneous dynamic range of a monobit electronic warfare radio receiver capable of continuously processing input data without a data storage capability.

It is another object of the present invention to provide an electronic warfare radio receiver capable of processing several simultaneous signals.

It is another object of the present invention to provide an electronic warfare radio receiver in which input signals are processed in a plurality of segregated frequency channels or receiver circuits.

It is another object of the present invention to provide a monobit electronic warfare radio receiver in which the complexity of using plural radio receiver circuits is compensated-for by enabled simplifications within each radio receiver circuit.

It is another object of the present invention to provide a monobit electronic warfare radio receiver in which use of plural radio receiver circuits is compensated-for by the ability to use lowered signal sampling rates, a decreased number of sample points and a simplified analog-to-digital converter in each radio receiver circuit.

It is another object of the present Invention to provide a monobit electronic warfare radio receiver in which plural radio receiver circuits are arranged to avoid aliasing signal duplications between signals processed.

It is another object of the present invention to provide a monobit electronic warfare radio receiver in which use of plural radio receiver circuits is compensated-for by the ability to use lowered signal sampling rates, a decreased number of sample points and a software embodiment in each radio receiver circuit.

These and other objects of the invention will become apparent as the description of the representative embodiments proceeds.

These and other objects of the invention are achieved by a monobit electronic warfare radio receiver of improved instantaneous dynamic range and favorable simultaneous input signal characteristics, said radio receiver comprising the combination of:

electrical wave filter means for dividing an analog radio frequency input signal of said monobit electronic warfare radio receiver into an m-plurality of segregated frequency band-located analog component signals;

analog to digital converter circuit means for converting each of said m-plurality of segregated frequency band-located analog component signals to digital signals:

each said analog to digital converter circuit means having limited operating characteristics commensurate with respective of said segregated frequency-band frequency ranges:

individual radio receiver circuit channel signal processing means each comprising one of m radio receiver circuit channels of said monobit electronic warfare radio receiver;

said individual radio receiver circuit channel signal processing means each including one of m-number of n-point discrete Fourier transformation elements of limited transformation rate with respect to a rate needed for a complete (n) times (m)-point discrete Fourier transformation within a selected time interval;

said m-plurality of adjacent frequency band-located analog component signals incurring minimal dynamic range-limiting cross channel interference within said individual radio receiver circuit channels;

said monobit electronic warfare radio receiver including asimultaneously received radio frequency input signals processing capacity increased by a multiplying factor of said m-plurality size.

BRIEF DESCRIPTION OF THE DRAWING

The accompanying drawings incorporated in and forming a part of the specification, illustrate several aspects of the present invention and together with the description serve to explain the principles of the invention. In the drawings.

DETAILED DESCRIPTION OF THE INVENTION

Figure 1:
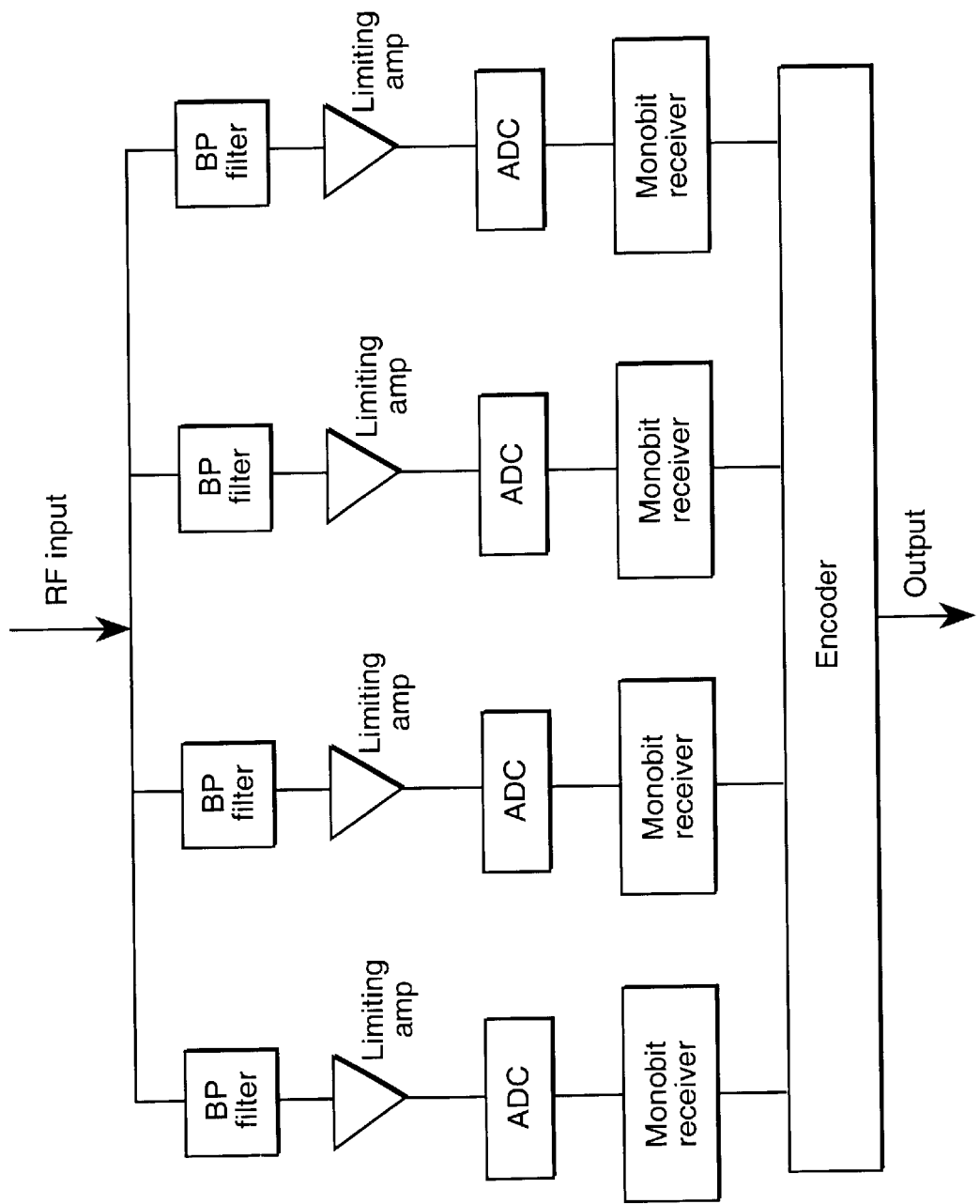
FIG. 1 shows a channelized monobit receiver in block diagram form.

As may have by now become apparent in reading this description of the present invention, an attempt has been made to maintain an easily discernable difference between the overall monobit electronic warfare radio receiver and the individual channels or the radio receiver circuits comprising this monobit electronic warfare radio receiver. For this purpose the names "monobit electronic warfare radio receiver" (MBR) and "radio receiver circuits" are used to the greatest degree possible in the text to describe the overall apparatus and the individual channel apparatus respectively.

In a monobit radio receiver the discrete Fourier transform mathematical function is used to determine the frequency content of a received radio frequency signal, a signal that may be in the form of a single pulse of radio frequency energy. Mathematically the discrete Fourier transform $X(k)$ may be expressed as $$X(k) = \sum_{n=0}^{N-1} x(n)e^{-\frac{j2\pi kn}{N}} \quad (1)$$

where x(n) is the digitized input signal, j is the √−1 operator, N is the total number of input points, k is an index number identifying a particular transformation coefficient and $$e^{-\frac{j2\pi kn}{N}}$$

is
referred to as the Kernel function. With changing values of k and n equation 1 of course expands into a sum of individual terms each having a signed numerical coefficient and each relating to a different frequency component of the input signal x(n) under consideration. According to the concept of the monobit receiver described in our two above-identified previous patents and a patent application, the Kernel function portion of equation 1 may take on values lying on a unit circle of values in order to obtain an approximate Kernel function realization and usable Fourier transformation coefficients without mechanizing a multiplication algorithm. Also as disclosed in our above identified patents and application eight of such approximate Kernel function values are available and these eight values are used in an acceptable approximation of the 256 values often desired in a practical monobit receiver having currently available real time analog to digital converter hardware and high speed sampling.

By way of background explanation the expression "monobit receiver" as used in the preceding and later paragraphs herein is believed to originate in applicants' laboratory in connection with a previous electronic warfare radio receiver arrangement in which an input signal is converted to a digital format wherein any input signal in excess of some threshold value is represented by digital signal words of one bit amplitude in ensuing signal processing circuits. Even though this early receiver arrangement has been improved-upon through a series of evolutions in which the converted input signal is represented by more than one digital signal amplitude and by other improvements, the name "monobit receiver" has become somewhat generic in referring to all of these systems including the receiver of the present invention—and notwithstanding the fact that differing digital signal amplitudes may be present. The monobit kernel of course processes one bit at a time.

By way of additional background explanation it may be helpful in appreciating the present invention to reconsider the results obtained when the above-recited equation 1 is expanded to determine the individual Fourier numeric coefficients or amplitudes relating to the different frequency components included in a received signal. These Fourier transformation numeric coefficients result from the successive values of 0, 1, 2, . . . N assumed by the variables n and k in equation 1 up to the terminal value N, for n, of for example 255. According to the concept of the above two prior patents and the monobit receiver of our prior work an approximation of each of the 256 data samples (samples 0–255) of a received data word is multiplied by the compromise signed unit circle Kernel function always having an amplitude of unity in order to implement equation 1 without requiring mechanization of a multiplication function. This use of four unit circle rather than 256 unit circle values is of course an approximation arrangement however it is experimentally found to produce usable but dynamic range-limited receiver performance.

FIG. 1 in the drawings shows a basic monobit electronic warfare radio receiver according to the present invention. In the FIG. 1 receiver the radio frequency input signal is divided into four frequency bands and then processed in four separate radio receiver circuit channels. one channel for each band. Each of the receiver circuit channels in FIG. 1 includes a bandpass filter, a limiting (or linear) amplifier, an analog-to-digital converter (ADC) and a monobit receiver circuit. The center frequencies of the FIG. 1 four bandpass filters are different and are consecutively disposed. In order to cover an instantaneous bandwidth of 1 GHz, the bandwidth of each FIG. 1 filter is about 250 MHz. The amplifiers, the analog-to-digital converters and the monobit receivers shown in FIG. 1 can be identical. The performance of the FIG. 1 channelized monobit electronic warfare radio receiver can be significantly better than that of other receivers of the electronic warfare type; two aspects of this better performance are particularly notable.

A. Signals of various frequencies can be filtered into different monobit receivers i.e., into different of the FIG. 1 receiver channels. Since each monobit receiver can normally process two input signals without difficulty, the FIG. 1 channelized receiver arrangement can in theory process 8 simultaneous radio frequency input signals.

B. Each channel in the FIG. 1 receiver is provided with its own limiting amplifier. The input to the ADC of a channel is therefore segregated from other channels, with minimum interference from adjacent channels and other signals. As a result, each channel of the FIG. 1 apparatus can be regarded as being an individual or independent receiver that is free of signal interaction effects. Such signal independence improves the instantaneous dynamic range characteristics of the receiver i.e.. its performance on simultaneous signals can be an improvement over that of other electronic warfare receivers and can eliminate the deficiencies of a monobit receiver.

Although there are four ADC's and four monobit receivers present in the FIG. 1 apparatus, the ADC and the monobit receiver used in the FIG. 1 channelized approach is in some respects less complex than would be required in a conventional receiver of FIG. 1 capability. For example, in order to cover an input bandwidth of 1 Gigahertz using a single monobit receiver, the sampling frequency used in current monobit receiver arrangements is 2.5 GHz. and the receiver performs a 256-point discrete Fourier transform (DFT). In a receiver arranged as shown in FIG. 1 however the sampling frequency can be dropped to 625 MHz (2.5 GHz/4) and the receiver need only perform a 64-point DFr. This lower sampling frequency and smaller size DFT represent significant relaxations and simplifications with respect to selecting the electronic hardware (or software) used to embody each channel of the FIG. 1 receiver.

In the FIG. 1 receiver a sorting process is embodied into the encoder circuit in order to identify the two highest amplitude frequency components (i.e., the two signals possible from a single monobit receiver circuit) in an output field of 32 outputs (i.e., the 32 independent outputs of a 64-point Fast Fourier transform). Using these parameters and the current state of the receiver fabrication art it is possible to build all four receivers on one integrated circuit chip. Other pulse width, sampling speed and packaging requirements can also be accommodated if properly scaled however the examples recited here represent the meeting of reasonable near term requirements.

One difficulty with the channelized approach to a monobit electronic warfare receiver as shown in FIG. 1 concerns the fact that a received signal may fall between the frequencies of two channels i.e., into the region of overlap between adjacent channels. Under this condition, a single input signal may be processed in duplicate by two adjacent channel circuits. This difficulty can be resolved by providing a comparison of the frequency-determining outputs from each two adjacent channels of the receiver. If two channels are thereby found to process signals of the same frequency, their outputs may be assumed to originate from a single received input signal.

Figure 2:
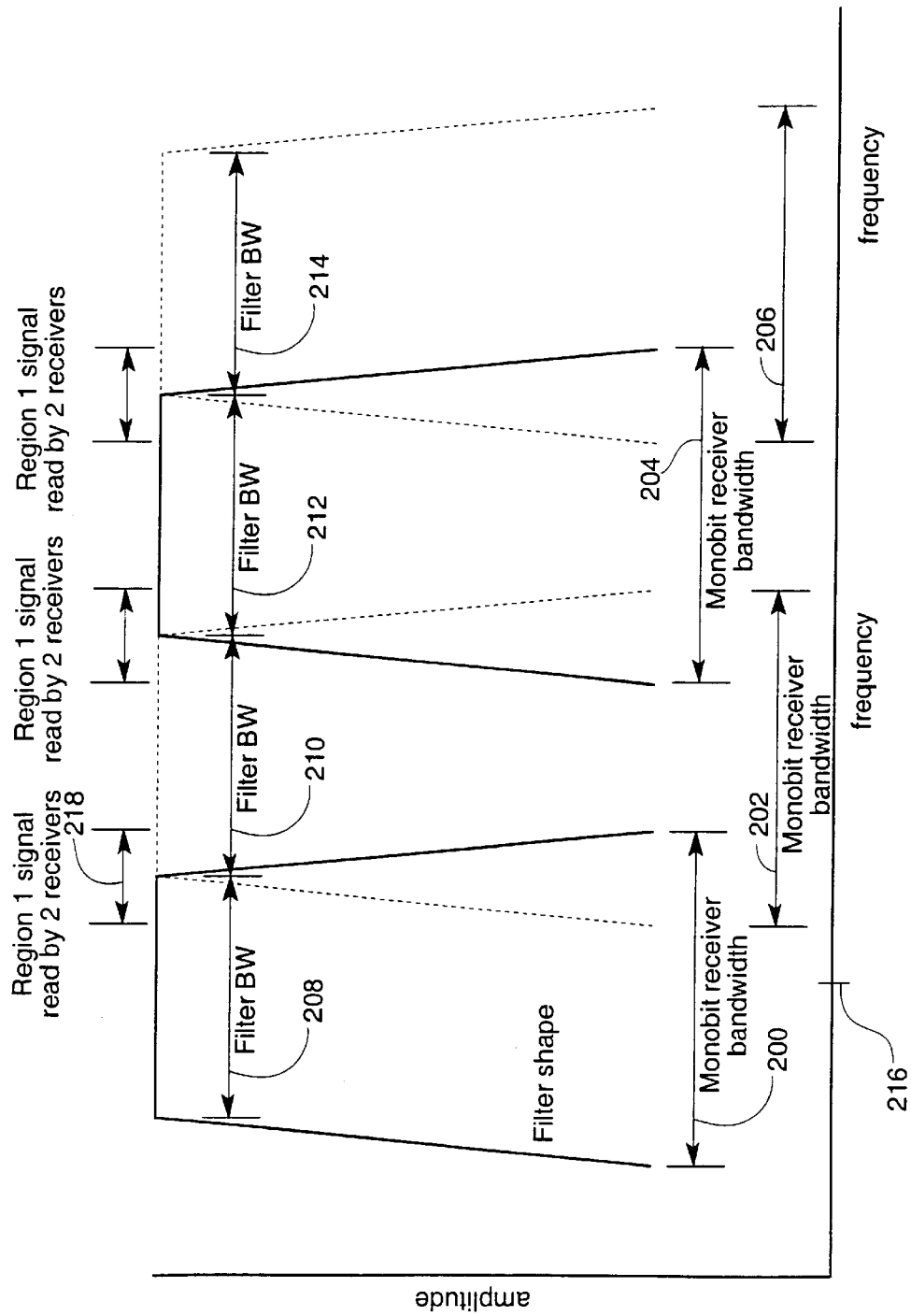
FIG. 2 shows possible filter frequency responses and bandwidths for a monobit receiver according to the present invention.

An example of this condition is represented in the frequency versus amplitude relationships shown in FIG. 2 of the drawings where the filter shapes and the bandwidth of each monobit receiver circuit are shown. In FIG. 1, each receiver bandwidth as represented at 200, 202, 204 and 206 is wider than the associated filter bandwidth as represented at 208, 210, 212 and 214. If a received signal is near the center of a filter bandwidth, as at the frequency f1 at 216 for example, the signal will be read by one monobit receiver as desired. If however a signal is near the edge of a filter bandwidth, as in the range 218 for example, the signal will be read by two adjacent monobit receiver circuits. The frequency determination from each of these receiver circuits should however be close in value. One can therefore declare that when two signals arrive at two adjacent receiver circuits at the same time and their frequency determinations are close in value these two readings originate from a single signal.

The FIG. 1 receiver arrangement can be extended to more than 4 channels. For example if 8 channels are used, as is shown in the FIG. 3 drawing, the sampling frequency may be 312.5 MHz (2.5 GHz/8) and the receiver performs a 32-point DFT. At this operating speed, it is possible that each monobit receiver function can be implemented using a software approach. The FIG. 3 receiver with the eight illustrated signal channels is theoretically capable of processing as many as sixteen received signals simultaneously. The channel width in such a receiver circuit should not however be significantly less than 100 MHz. Otherwise the transient effect on the signal output caused by the filter limits the capability to measure short pulses. (A narrow band filter has longer transient time therefore if the transient time is longere than the pulse width the filtered pulses cannot be measured correctly.)

Figure 3:
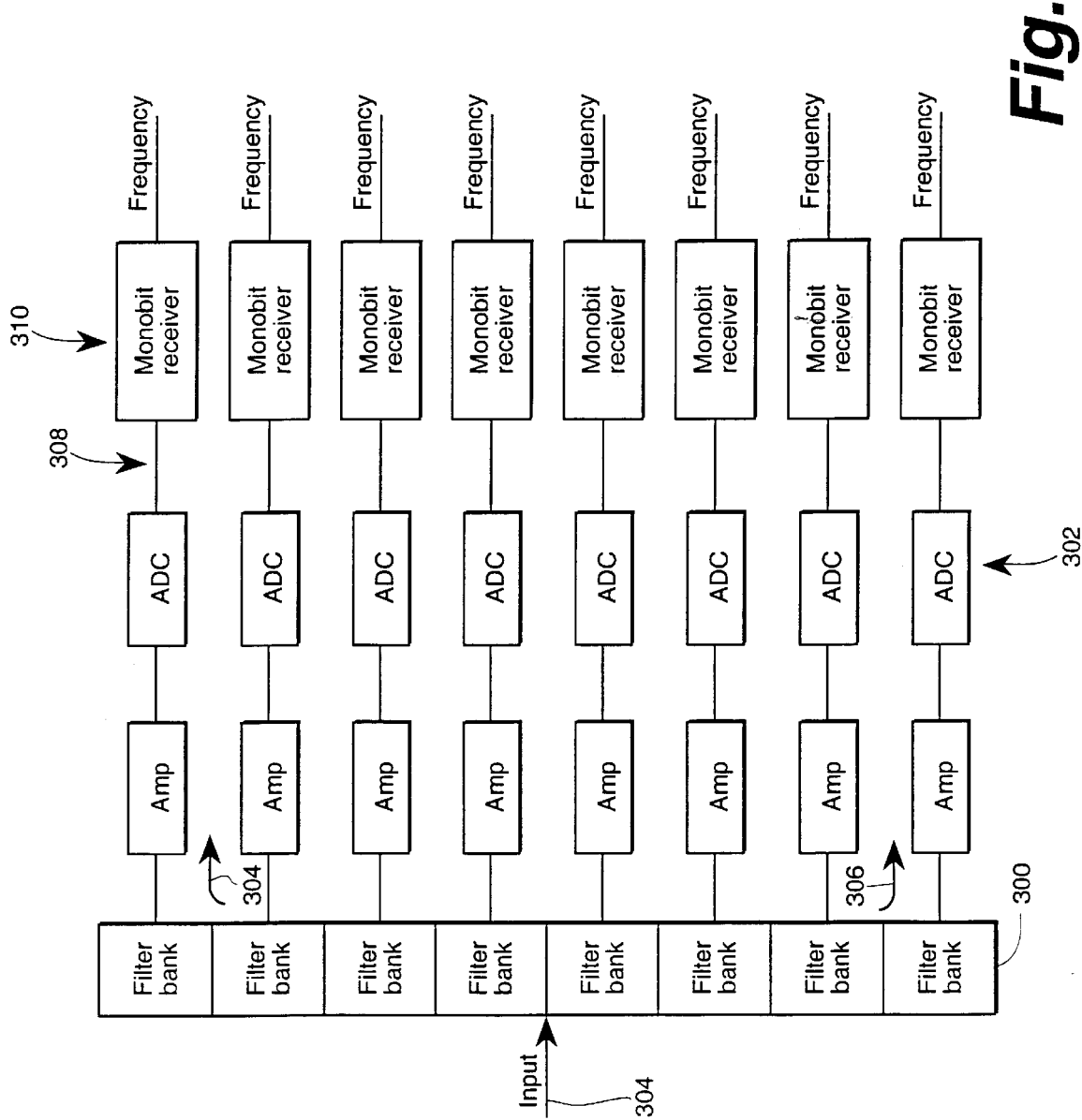
FIG. 3 shows a block diagram of second channelized monobit receiver having a greater number of channels.
Figure 4:
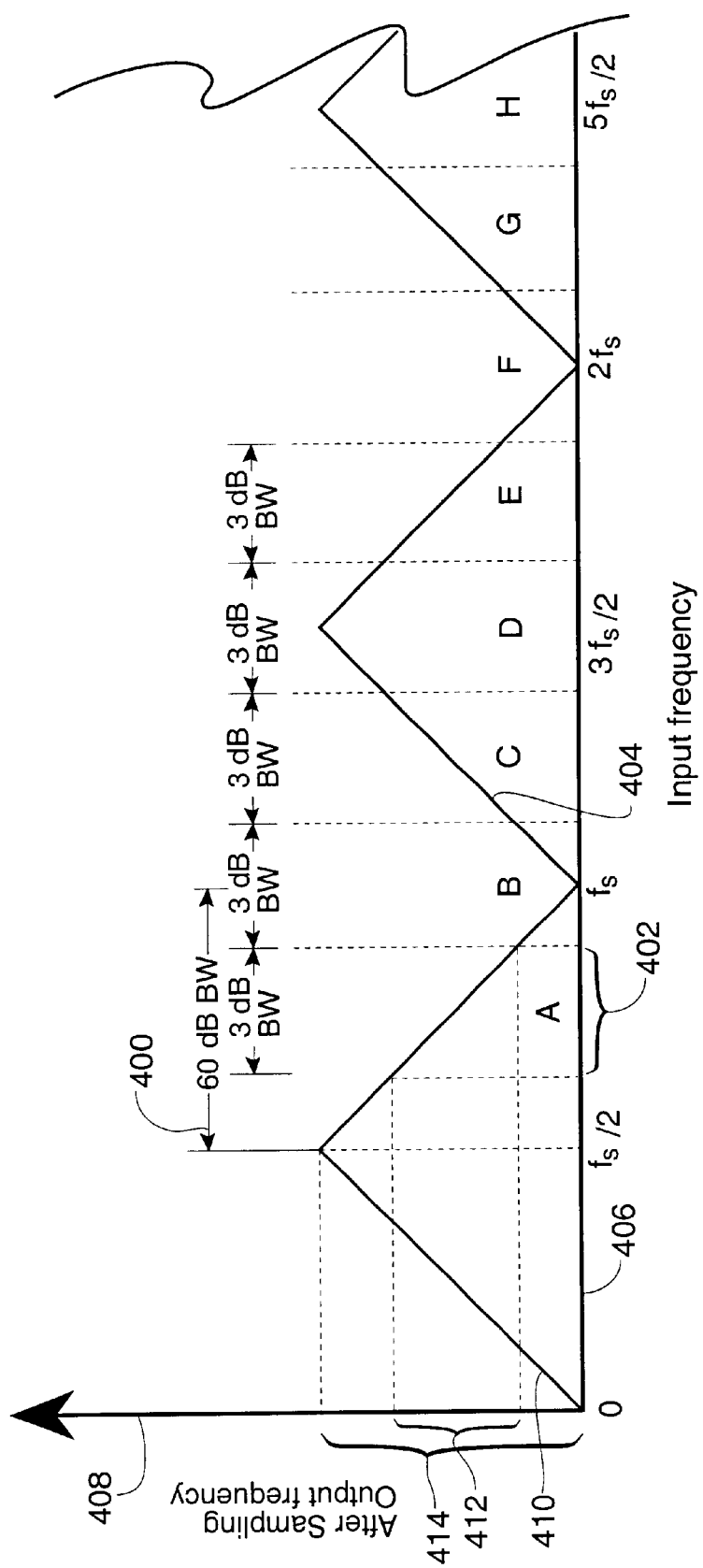
FIG. 4 shows a source of aliasing error in a channelized monobit receiver.

FIG. 4 in the drawings shows bandwidth considerations for parts of the FIG. 3 eight-channel receiver. In the FIG. 3 receiver and the FIG. 4 bandwidth drawing the narrow band filters in the array at 300 limit the input bandwidth to the analog-to-digital converters at 302 so that each analog-to-digital converter at 302 and each receiver circuit at 310 for examples covers only a portion of the overall receiver input band. For the FIG. 3 eight channel receiver the 3 dB bandwidth for each receiver circuit channel is 125 megahertz (i.e., 1000/8 where 1 gigahertz or 1000 megahertz is a representative FIG. 1 monobit receiver input bandwidth.) The 60 dB filter selectivity limits the bandwidth as shown in FIG. 2 to 250 megahertz (i.e., to a 3 dB bandwidth of 125 megahertz.) Therefore in order to eliminate ambiguity between receiver circuit channels each channel should cover a frequency range of 250 megahertz.

Since the Nyquist sampling criterion requires the analog-to-digital converters in FIG. 3 to operate at twice the bandwidth frequency the FIG. 3 analog-to-digital converters should operate at twice the 250 megahertz rate or at 500 megahertz, a rate which is yet much slower than the 2.5 gigahertz sampling rate used in the usual wide bandwidth monobit electronic warfare receiver, a monobit receiver such as disclosed in the above-identified patents/application. Operating at this sampling rate can however cause a band-overlapping problem as is represented in the FIG. 4, FIG. 5 and FIG. 6 drawings.

Figure 5:
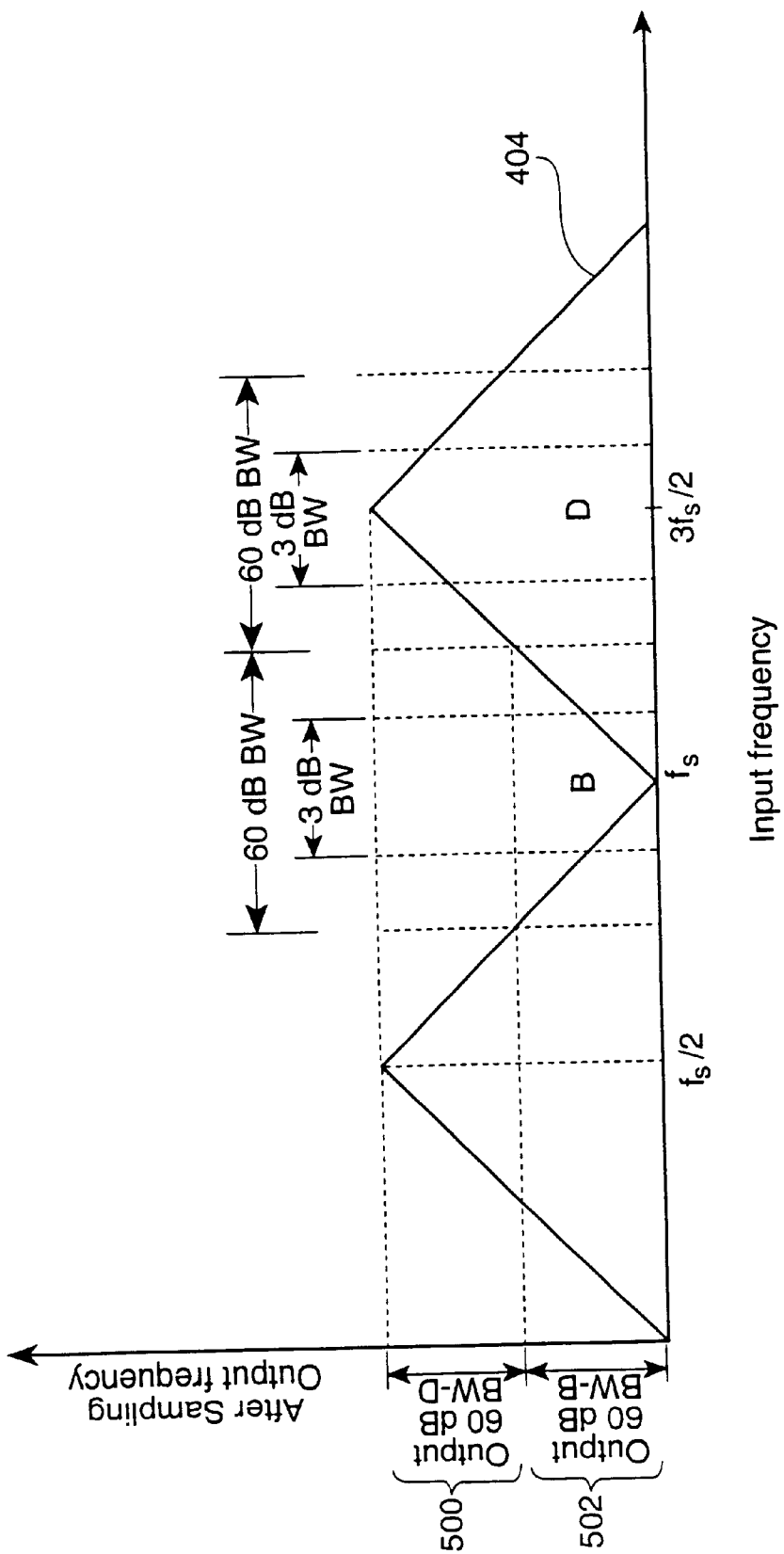
FIG. 5 shows band overlapping caused by aliasing in a channelized monobit receiver.
Figure 6:
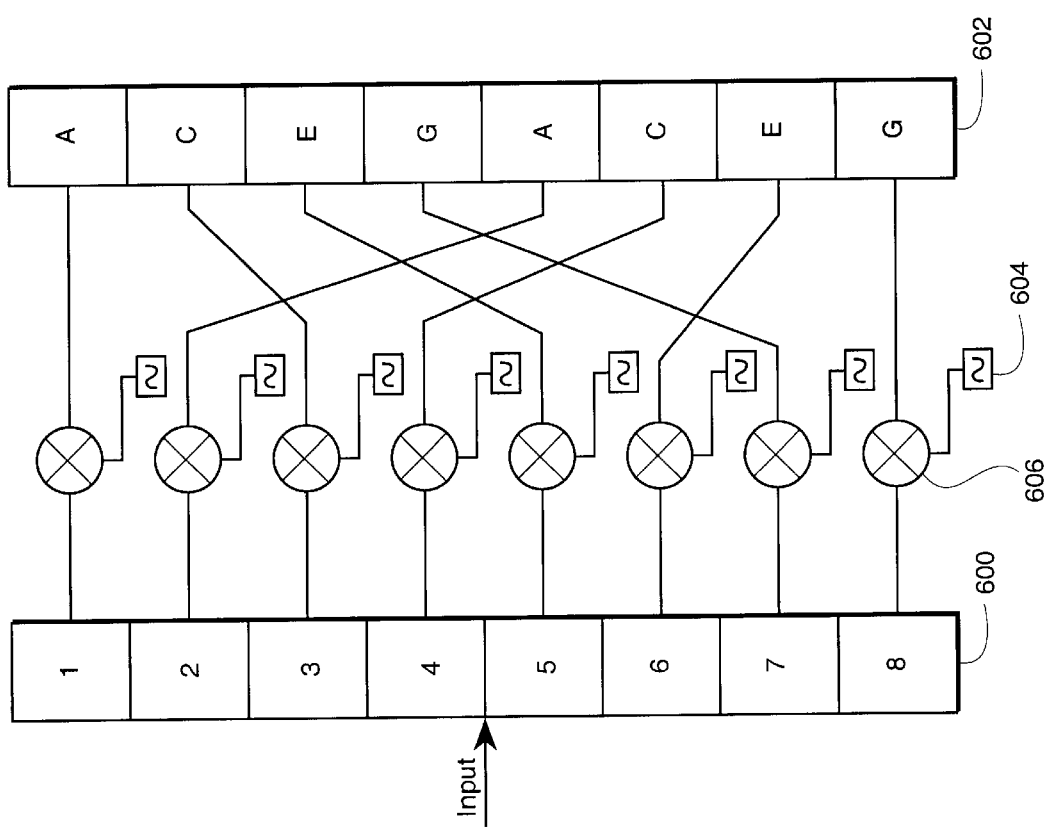
FIG. 6 shows an improved diminished aliasing front-end arrangement for a channelized monobit receiver.

The frequency relationships shown in FIG. 4 and FIG. 5 may be viewed as a way of demonstrating the source of the band-overlapping problem encountered in a digital receiver (overlap does not occur in an analog receiver) and therefore as justifying the receiver front-end modification represented in the FIG. 6 drawing. The FIG. 4 drawing shows the relationship between overall receiver input frequency i.e., frequencies encountered at 304 in the FIG. 3 drawing, and the frequencies in the baseband digital (bbd) signal output of the analog to digital converters, the frequency appearing on the paths 308 in FIG. 3. The bbd signal is represented at 414 in FIG. 4. The FIG. 4 input to output relationship takes on the form of the saw tooth-shaped "curve" 404 in the FIG. 4 drawing. As may be observed from this relationship and from the FIG. 3 drawing a channelized digital monobit receiver has the overall effect of converting a relatively large band of input signal frequencies to a relatively small band of output frequencies, frequencies determined by the sampling rate $f_s$ used in the analog-to-digital converter of the receiver. The saw tooth curve 404 may extend to the right in FIG. 4 for many more cycles than are shown depending on receiver input pass band characteristics. As a matter of aside interest an analog monobit receiver does not respond in the manner of the saw tooth curve in FIG. 4 but instead is characterized by an onward and upward extension of the curve segment 410 so that no band-overlapping problem is encountered.

In the FIG. 4 drawing individual channel filter bandwidths (as measured at the 3 dB point) appear at 402 for example and are identified with the letters A, B, C and so-on. A monobit receiver bandwidth as measured at the 60 dB down point, a bandwidth such as appears in the FIG. 2 drawing herein is represented at 400 in FIG. 4. Also appearing in the FIG. 4 drawing are the input frequency range segments between 0 and $f_s/2$, $f_s/2$ and $f_s$, $f_s$ and $3f_s/2$ and so on. These frequency ranges may be referred-to as a first alias frequency range, a second alias frequency range, a third alias frequency range and so-on in the sense that an input frequency within any of these ranges, measured along the horizontal axis 406, may achieve the same output frequency along the vertical axis 408. The scales along the horizontal and vertical axes 406 and 408 in FIG. 4 are made equal in order to simplify this description.

A significant aspect of the FIG. 4 drawing for present discussion purposes concerns the fact that an input signal located within any of the 3 dB bandwidths identified with the letters A, C, E, or G provides a post-sampling output frequency, represented at 412 in FIG. 4, of bandwidth equal to its input bandwidth while an input signal located within any of the 3 dB bandwidths identified with the letters B, D, F, or H provides a post-sampling output frequency of bandwidth less than its input bandwidth. Moreover in the FIG. 4 input signal bandwidths identified with the letters B, D, F, or H the same output signal frequency may be generated by two different input frequencies. Clearly therefore the former mode of receiver operation involving the input bandwidths identified with the letters A, C, E, or G appears thus-far preferable for implementing a monobit electronic warfare receiver.

FIG. 5 in the drawings shows an input frequency to output frequency relationship similar to that of FIG. 4 except that the diminished output bandwidths corresponding to the input bandwidths identified with the letters B, D, F, or H are represented at 500 and 502 along the output frequency axis.

Notably in the FIG. 5 drawing each of the peak and valley points in the curve 404 provides an output bandwidth of similar extent, an extent less than that of the desired extent shown at 412 in the FIG. 4 drawing. Moreover in the FIG. 5 input signal bandwidths identified with the letters B, D, and also F, or H and so on the same output signal frequency may be generated by two different input frequencies.

Clearly therefore this latter mode of receiver operation involving the FIG. 4 input bandwidths identified with the letters B, D, F, or H is undesirable and to be avoided in implementing a usable monobit electronic warfare receiver. In principle such avoidance may be accomplished by insuring that no input signal of frequency within the bandwidths identified with the letters B, D, F, or H and so on is received. Of course a radio receiver, especially a military receiver, has no control over the frequency of the signals it is exposed to and moreover such a receiver cannot afford to have gaps or voids in its input pass-band. The needed pass-band exclusions may however be provided by way of the receiver front-end modification represented in the FIG. 6 drawing. This modification has the effect of transposing or moving alias regions to differing locations along the axis 406 in FIG. 4. Additional discussion concerning the input frequency to output frequency relationships shown in FIG. 4 and FIG. 5 of the drawings and to the FIG. 6 resolution of the related filter overlap difficulty is to be found in the recently published textbook of James Tsui one of the inventors named herein, the textbook "Fundamentals of Global Positioning Receivers: A Software Approach" published by John Wiley and Sons, Incorporated of New York, N.Y. The contents of this textbook are hereby incorporated by reference herein.

In the FIG. 6 drawing a filter array such as represented at 300 in FIG. 3 is shown at 600. Also shown at 602 in FIG. 6 is an identification of the desired 3 dB bandwidths, the bandwidths identified with the letters A, C, E or G in the FIG. 3 drawing. In essence therefore the FIG. 6 circuit arrangement shows how an input signal originally disposed in any input bandwidth of the electronic warfare receiver may result in an output signal located in the desired A, C, E or G output bandwidths. This locating is accomplished by way of the series of local oscillator circuits indicated generally at 604 in FIG. 6 together with the associated signal mixer heterodyne circuits shown generally at 606. The local oscillator circuits 604 are of course each of a different frequency and are arranged to provide the desired output frequency in the respective bandwidths identified with the letters A, C, E or G by way of the heterodyning mixer arrangement known in the art. Notably in FIG. 6 the output signals from two or more input filters are disposed in the same output frequency bandwidths i.e., there are two sources of bandwidth A signals, two sources of bandwidth B signals and so on in FIG. 6.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

We claim:

1. The method of increasing an instantaneous dynamic range characteristic and a simultaneously processable number of input signals characteristic in a monobit electronic warfare radio receiver, said method comprising the steps of:
    dividing an analog radio frequency input signal of said monobit electronic warfare radio receiver into an m-plurality of adjacent frequency band-located analog component signals;
    converting each of said m-plurality of adjacent frequency band-located analog component signals to respective frequency band-related digital signals in an analog to digital converter circuit having speed-limited operating characteristics commensurate with said frequency-band limited operating characteristics;
    processing each respective of said adjacent frequency band-related digital signals in one individual radio receiver circuit channel of a multi channel-arranged monobit electronic warfare radio receiver;
    said processing step including performing an n-point discrete Fourier transformation for said analog radio frequency input signal as m component transformations each of n/m transformation point size and 1/m transformation rate limitation with respect to a rate needed for said n-point discrete Fourier transformation;
    said m-plurality of adjacent frequency band-located analog component signals incurring minimal dynamic range-limiting cross channel interference in said individual radio receiver circuit channels;
    said monobit electronic warfare radio receiver having a simultaneously received radio frequency input signals processing capacity increased by a multiplying factor of said m-plurality size.

2. The method of increasing an instantaneous dynamic range characteristic and a simultaneously processable number of input signals characteristic in a monobit electronic warfare radio receiver of claim 1 further including the step of sorting among a plurality of output signals of said monobit electronic warfare radio receiver to identify input signal frequencies having output signals represented by largest signal amplitudes.

3. The method of increasing an instantaneous dynamic range characteristic and a simultaneously processable number of input signals characteristic in a monobit electronic warfare radio receiver of claim 1 wherein said step of dividing an analog radio frequency input signal of said monobit electronic warfare radio receiver into an m-plurality of adjacent frequency band-located analog component signals includes coupling said input signals to a plurality of bandpass electrical wave filters.

4. The method of increasing an instantaneous dynamic range characteristic and a simultaneously processable number of input signals characteristic in a monobit electronic warfare radio receiver of claim 1 wherein said n-point discrete Fourier transformation comprises a 256-point Fourier transformation.

5. The method of increasing an instantaneous dynamic range characteristic and a simultaneously processable number of input signals characteristic in a monobit electronic warfare radio receiver of claim 4 wherein said 256-point Fourier transformation includes unit value Kernel function approximations.

6. The method of increasing an instantaneous dynamic range characteristic and a simultaneously processable number of input signals characteristic in a monobit electronic warfare radio receiver of claim 4 wherein said 256-point Fourier transformation includes Kernel function approximations of summed unit length components magnitude.

7. The method of increasing an instantaneous dynamic range characteristic and a simultaneously processable number of input signals characteristic in a monobit electronic warfare radio receiver of claim 4 wherein said m-plurality of adjacent frequency band-located analog component signals are one of four and eight analog component signals and wherein said component transformations each of n/m transformation point size are thereby one of 64 and 32 point Fourier transformations.

8. The method of increasing an instantaneous dynamic range characteristic and a simultaneously processable number of input signals characteristic in a monobit electronic warfare radio receiver of claim 1 wherein said step of processing each respective of said adjacent frequency band-related digital signals in one individual radio receiver circuit channel of a multi channel-arranged monobit electronic warfare radio receiver includes amplifying each of said digital signals in one of a limiting amplifier and a linear amplifier circuit.

9. The method of increasing an instantaneous dynamic range characteristic and a simultaneously processable number of input signals characteristic in a monobit electronic warfare radio receiver of claim 1 wherein said step of processing each respective of said adjacent frequency band-related digital signals in one individual radio receiver circuit channel of a multi channel-arranged monobit electronic warfare radio receiver includes processing said frequency band-related digital signals in separate amplifying channels of a single integrated circuit chip.

10. The method of increasing an instantaneous dynamic range characteristic and a simultaneously processable number of input signals characteristic in a monobit electronic warfare radio receiver of claim 1 wherein said step of processing each respective of said adjacent frequency band-related digital signals includes a signal sampling frequency below 350 megahertz and said processing step includes software embodied signal processing steps.

11. A monobit electronic warfare radio receiver of improved instantaneous dynamic range and favorable simultaneous input signal characteristics, said radio receiver comprising the combination of:

electrical wave filter means for dividing an analog radio frequency input signal of said monobit electronic warfare radio receiver into an m-plurality of segregated frequency band-located analog component signals;

analog to digital converter circuit means for converting each of said m-plurality of segregated frequency band-located analog component signals to digital signals;

each said analog to digital converter circuit means having limited operating characteristics commensurate with respective of said segregated frequency-band frequency ranges;

individual radio receiver circuit channel signal processing means each comprising one of m radio receiver circuit channels of said monobit electronic warfare radio receiver;

said individual radio receiver circuit channel signal processing means each including one of m-number of n-point discrete Fourier transformation elements of limited transformation rate with respect to a rate needed for a complete (n) times (m)-point discrete Fourier transformation within a selected time interval;

said m-plurality of adjacent frequency band-located analog component signals incurring minimal dynamic range-limiting cross channel interference within said individual radio receiver circuit channels;

said monobit electronic warfare radio receiver including a simultaneously received radio frequency input signals processing capacity increased by a multiplying factor of said m-plurality size.

12. The monobit electronic warfare radio receiver of improved instantaneous dynamic range and favorable simultaneous input signal characteristics of claim 11 wherein said m-plurality of segregated frequency band-located analog component signals comprise adjacent frequency band-located analog signals.

13. The monobit electronic warfare radio receiver of improved instantaneous dynamic range and favorable simultaneous input signal characteristics of claim 12 further including local oscillator and heterodyne mixer means for converting said adjacent frequency band-located analog signals to signals of translated frequency bands.

14. The monobit electronic warfare radio receiver of improved instantaneous dynamic range and favorable simultaneous input signal characteristics of claim 13 wherein said translated frequency bands signals include signals disposed in repeating frequency bands and excludes signals disposed in frequency bands located in overlapping frequency band locations of filter elements in said electrical wave filter means.

15. The monobit electronic warfare radio receiver of improved instantaneous dynamic range and favorable simultaneous input signal characteristics of claim 13 wherein said individual radio receiver circuit channel signal processing means includes an element of said analog to digital converter circuit means for converting each of said m-plurality of segregated frequency band-located analog component signals to digital signals.

16. The monobit electronic warfare radio receiver of improved instantaneous dynamic range and favorable simultaneous input signal characteristics of claim 15 wherein said selected time interval of said m-number of n-point discrete Fourier transformation elements comprises a rate commensurate with real time operation of said n-point discrete Fourier transformation elements.

17. The monobit electronic warfare radio receiver of improved instantaneous dynamic range and favorable simultaneous input signal characteristics of claim 11 further including signal encoder means for selecting a greatest magnitude Fourier transformation output signal of each said m radio receiver circuit channels.

18. The monobit electronic warfare radio receiver of improved instantaneous dynamic range and favorable simultaneous input signal characteristics of claim 11 wherein said m-number of n-point discrete Fourier transformation elements each include a unit value Kernel function approximation.

19. Electronic warfare radio receiver apparatus of desirable instantaneous dynamic range and favorable input signal count characteristics, said radio receiver comprising the combination of:

an electrical wave filter array dividing an analog radio frequency input signal in said electronic warfare radio receiver into an m-plurality of adjacent frequency band-located analog component signals;

an m-plurality of signal processing channels each comprising one of a radio receiver circuit channel of said -monobit electronic warfare radio receiver;

an m plurality of analog to digital converter circuits, one in each of said radio receiver circuit channels, and each having an analog component signals to respective frequency band-related channel digital signals converting characteristic with respect to one of said plurality of adjacent frequency band-analog component signals;

each said analog to digital converter circuit having limited operating characteristics commensurate with characteristics of respective of said channel digital signals;

said signal processing channels each also including an n-point discrete Fourier transformation element of limited 1/m transformation rate with respect to a rate needed for a complete (n)·(m)-point discrete Fourier transformation of all said channel digital signals;

said m-plurality of adjacent frequency band-located channel digital signals incurring minimal dynamic range-limiting cross channel interference in said signal processing channels;

said monobit electronic warfare radio receiver also processing a count of simultaneously-received radio frequency input signals increased by a multiplying factor of said m-plurality magnitude;

an encoder circuit identifying greatest amplitude output signals of said radio receiver circuit channels.

20. Electronic warfare radio receiver apparatus of desirable instantaneous dynamic range and favorable simultaneous input signal count acceptance characteristics, said apparatus comprising the combination of:

an electrical wave filter array dividing an analog radio frequency input signal received in said electronic warfare radio receiver into a plurality of adjacent frequency band-located analog component signals;

a plurality of signal processing channels each comprising an isolated radio receiver circuit apparatus portion of said monobit electronic warfare radio receiver;

a plurality of analog to digital converter circuits, one in each said radio receiver circuit apparatus portion;

each said analog to digital converter circuit converting an adjacent frequency band-located analog component signal to a respective frequency band-related signal processing channel digital signal;

each said analog to digital converter circuit having limited operating characteristics commensurate with characteristics of respective frequency band-related signal processing channel digital signals;

said signal processing channels each also including a discrete Fourier transformation circuit of limited operating characteristics commensurate with characteristics of respective frequency band-related signal processing channel digital signals;

an encoder circuit identifying greatest amplitude Fourier transformation output signals of said radio receiver circuit channels;

whereby said adjacent frequency band-located analog component signals and said signal processing channel digital signals incur minimal dynamic range-limiting cross channel interference within said signal processing channels and said electronic warfare radio receiver apparatus processes a number of simultaneously-received radio frequency input signals increased by a multiplying factor of magnitude equal to said signal processing channels plurality.

21. The electronic warfare radio receiver apparatus of claim 20 further including:

a plurality of signal mixer circuits each connected with a different filter element of said electrical wave filter array and generating selected frequency band-located analog output signals coincident with selected frequency band-located analog output signals of another signal mixer circuit connecting with a differing filter element of said electrical wave filter array;

said selected frequency band-located analog output signals coincident with selected frequency band-located analog output signals of another signal mixer circuit including signals shifted in frequency location to be free of signals located in frequency overlap regions of said electrical wave filter array elements;

a plurality of local oscillator circuits each of different operating frequency and each having an output signal connected with one of said plurality of signal mixer circuits.

* * * * *

UNITED STATES PATENT AND TRADEMARK OFFICE
CERTIFICATE OF CORRECTION

PATENT NO. : 6,448,921 B1 Page 1 of 1
DATED : September 10, 2002
INVENTOR(S) : James B.Y. Tsui et al.

It is certified that error appears in the above-identified patent and that said Letters Patent is hereby corrected as shown below:

Column 1,
Line 16, "A" should be deleted.

Column 3,
Line 42, "Invention" should not be capitalized.

Column 6,
Line 49, "DFr" should read -- DFT --.

Column 7,
Line 43, "longere" should read -- longer --.

Signed and Sealed this

Fifteenth Day of April, 2003

JAMES E. ROGAN
*Director of the United States Patent and Trademark Office*